(12) United States Patent
Kariyama et al.

(10) Patent No.: US 8,746,107 B2
(45) Date of Patent: Jun. 10, 2014

(54) BICYCLE CABLE STRUCTURE

(75) Inventors: Osamu Kariyama, Sakai (JP);
Masahiro Nakakura, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/273,429

(22) Filed: Oct. 14, 2011

(65) Prior Publication Data

US 2013/0091975 A1    Apr. 18, 2013

(51) Int. Cl.
| F16C 1/12 | (2006.01) |
| F16C 1/20 | (2006.01) |
| B60T 1/06 | (2006.01) |
| B60T 11/04 | (2006.01) |
| B60T 7/10 | (2006.01) |
| F16C 1/10 | (2006.01) |

(52) U.S. Cl.
CPC ............ B60T 1/06 (2013.01); B60T 11/046 (2013.01); B60T 7/102 (2013.01); F16C 1/101 (2013.01)
USPC ........ 74/502.4; 74/502.6; 74/502.2; 74/500.5

(58) Field of Classification Search
CPC ............................................... B60T 1/06
USPC ........ 74/502.2, 502.4, 502.6, 501.5 R, 500.5; 269/228; 188/24.15; 192/83
See application file for complete search history.

(56) References Cited

U.S. PATENT DOCUMENTS

| 2,574,281 | A | * | 11/1951 | Olson | 29/271 |
| 4,448,090 | A | * | 5/1984 | Carre et al. | 74/501.5 R |
| 5,109,968 | A | * | 5/1992 | Pollitt et al. | 192/83 |
| 5,540,304 | A | * | 7/1996 | Hawkins et al. | 188/24.15 |
| 5,685,199 | A | * | 11/1997 | Malone | 74/502.4 |
| 5,857,386 | A | * | 1/1999 | Ruhlman | 74/502.4 |
| 5,906,140 | A | * | 5/1999 | Smith | 74/502.2 |
| 6,212,969 | B1 | * | 4/2001 | Kuo | 74/500.5 |
| 6,561,057 | B2 | * | 5/2003 | Cebollero | 74/502.4 |
| RE39,327 | E | * | 10/2006 | Reasoner | 74/502.4 |
| 7,614,634 | B2 | | 11/2009 | Lane | |
| 7,946,395 | B1 | | 5/2011 | Tsai | |
| 2007/0062323 | A1 | * | 3/2007 | Shahana et al. | 74/502.2 |
| 2007/0158382 | A1 | * | 7/2007 | Zins et al. | 227/8 |
| 2009/0228054 | A1 | * | 9/2009 | Hoffman et al. | 606/86 A |
| 2009/0301252 | A1 | * | 12/2009 | Hsu | 74/489 |

FOREIGN PATENT DOCUMENTS

DE    44 27 772 A1  *  2/1996  ............ B62H 5/00

* cited by examiner

*Primary Examiner* — Vinh Luong
(74) *Attorney, Agent, or Firm* — Global IP Counselors (57) ABSTRACT

A bicycle cable structure is provided with an inner cable, a first outer case, a second outer case and an adjustment structure. The first and second outer cases are disposed over first and second sections of the inner cable and the adjustment structure is disposed between adjacent ends of the first and second outer cases. The adjustment structure includes a main body and an operating member. The operating member is movably connected to the main body by a non-slidable connection between a first position and a second position. The operating member maintains the adjacent ends of the first and second outer cases farther away from each other while the operating member is in the first position as compared to the second position of the operating member.

18 Claims, 9 Drawing Sheets

BICYCLE CABLE STRUCTURE

BACKGROUND

1. Field of the Invention

This invention generally relates to a bicycle cable structure. More specifically, the present invention relates to a bicycle cable structure for changing an effective length of an outer case of a bicycle cable.

2. Background Information

Bicycles often have components that are manually operated by a bicycle control cable (e.g., a brake cable and a gear shift cable). In particular, the bicycle control cable interconnects a "manually operated part" of bicycle to a "cable operated part" of bicycle. Examples of "manually operated parts" include brake levers and gear shifters. Examples of "cable operated parts" include brake devices and gear changing devices. Typically, conventional bicycle control cables have, for example, a tubular outer case and an inner wire that can be inserted into and passed through the outer case. The inner wire protrudes beyond both ends of the outer case and each end of the inner wire is connected to either a manually operated part or a cable-operated part. This type of bicycle control cable is often called a Bowden type of bicycle control cable.

In some bicycle brake systems, a bicycle brake is provided with a brake opening structure. This brake opening structure is often disposed on a brake arm which is connected a brake cable. This brake opening structure is provided with a quick opening lever that is operated turned to opening position in clock direction so that both brake arms are moved to an opening position in order to quick and easy disassemble (releasable) a wheel rim.

Recently, for aero dynamics, the brake is sometime disposed on behind of a bicycle frame. For example, as disclosed, in U.S. Pat. No. 7,614,634 B2, a rear brake is disposed behind of the seat tube and close to bottom bracket. Also for example, as disclosed in U.S. Pat. No. 7,946,395 B1, a front brake is disposed behind of the front fork. In these cases, the brake opening structure may be omitted because it is difficult for the rider to operate such a brake opening structure when the brake is disposed in such locations as behind the seat tube or the front fork. Thus, for these cases, an in-line brake opening structure has been developed that is disposed in a brake cable. In this in-line brake opening structure, a cam rod is provided in a body member such that the cam rod slides perpendicular to the axis of the inner wire for moving adjacent ends of the outer cases farther apart or closer together. In this in-line brake opening structure, the cam rod extends out of the body member while the cam rod is in the closed position with the adjacent ends of the outer cases spread apart from each other. With the cam rod extending out of the body member in this fashion the cam rod could be accidentally hit such that the cam rod will move to the opened position such that adjacent ends of the outer cases will move closer together.

SUMMARY

One aspect is to provide a bicycle cable structure with an operating member which securely maintains adjacent ends of outer cases in spread apart position from each other.

In view of the state of the known technology, a bicycle cable structure is provided that basically comprises an inner cable, a first outer case, a second outer case and an adjustment structure. The first outer case is disposed over a first section of the inner cable. The second outer case is disposed over a second section of the inner cable. The adjustment structure is disposed between adjacent ends of the first and second outer cases. The adjustment structure includes a main body and an operating member. The main body has a first end with a first opening, a second end with a second opening and a through hole extending through the main body between the first and second openings in the first and second ends. The operating member is movably connected to the main body by a non-slidable connection between a first position and a second position. The operating member maintains the adjacent ends of the first and second outer cases farther away from each other while the operating member is in the first position as compared to the second position of the operating member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
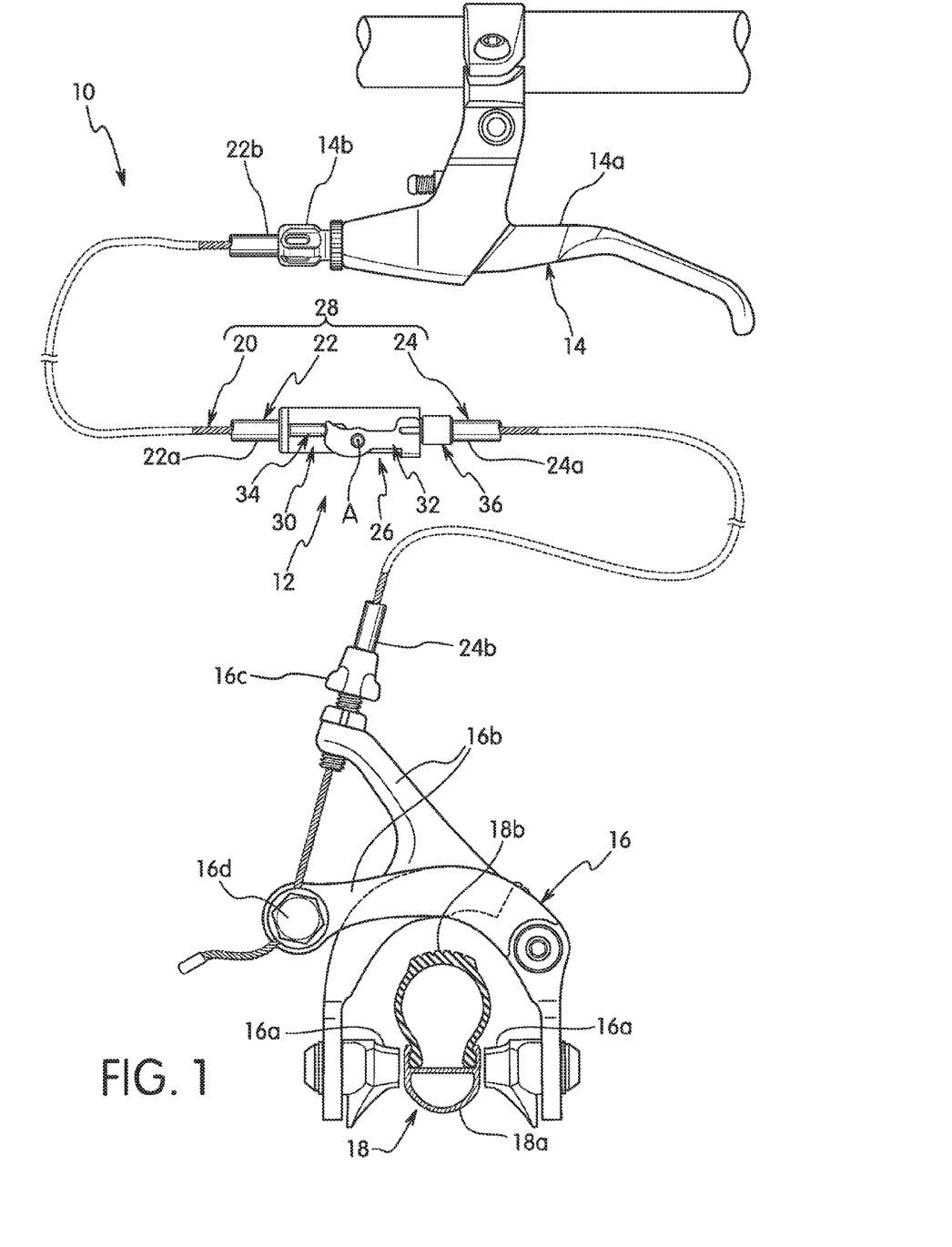
FIG. 1 is a diagrammatic view of a bicycle braking system that is equipped with a bicycle cable structure in accordance with a first embodiment showing the operating member of the bicycle cable structure in the closed position.
Figure 2:
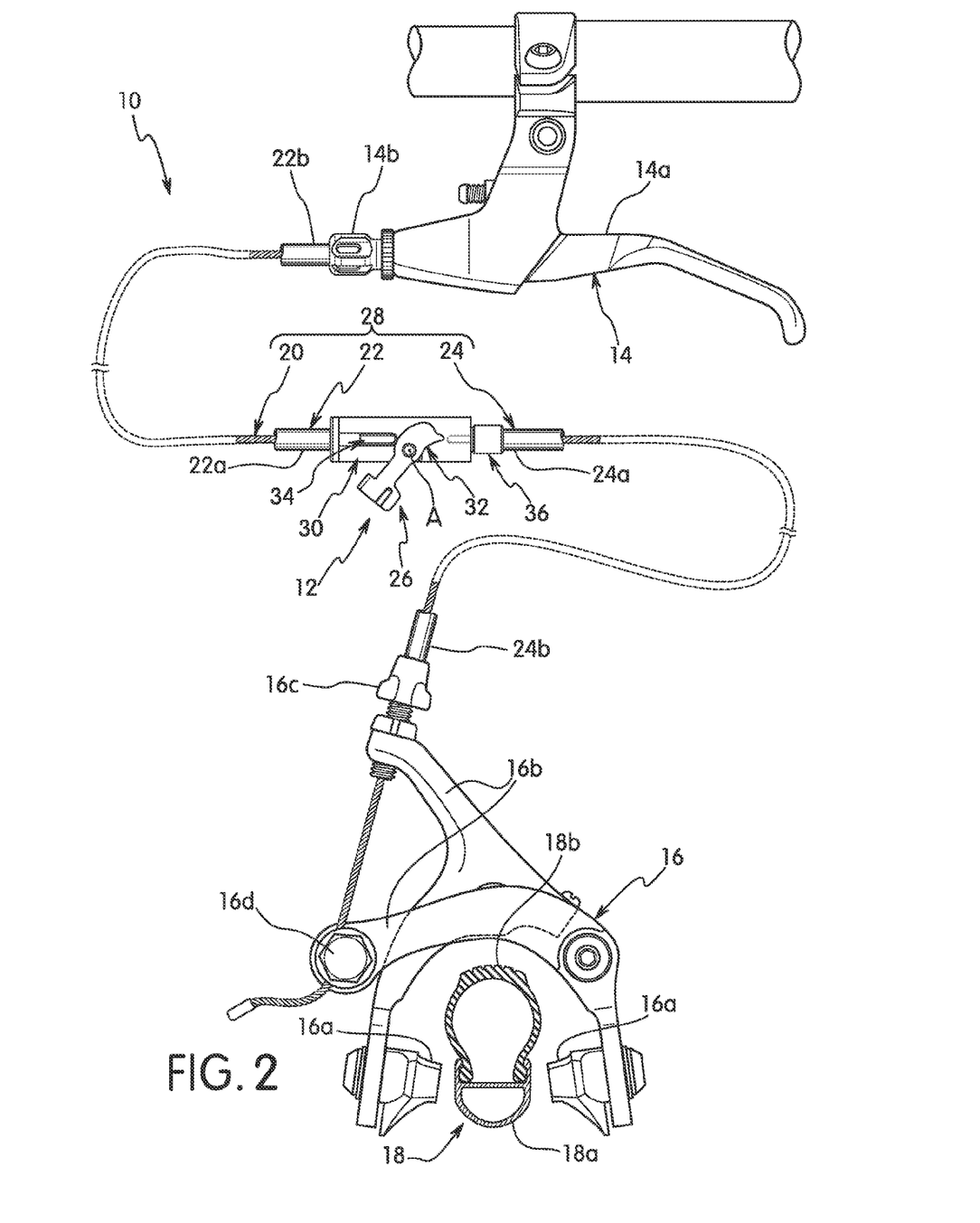
FIG. 2 is a diagrammatic view of the bicycle braking system illustrated in FIG. 1 showing the operating member of the bicycle cable structure in the opened position.
Figure 3:
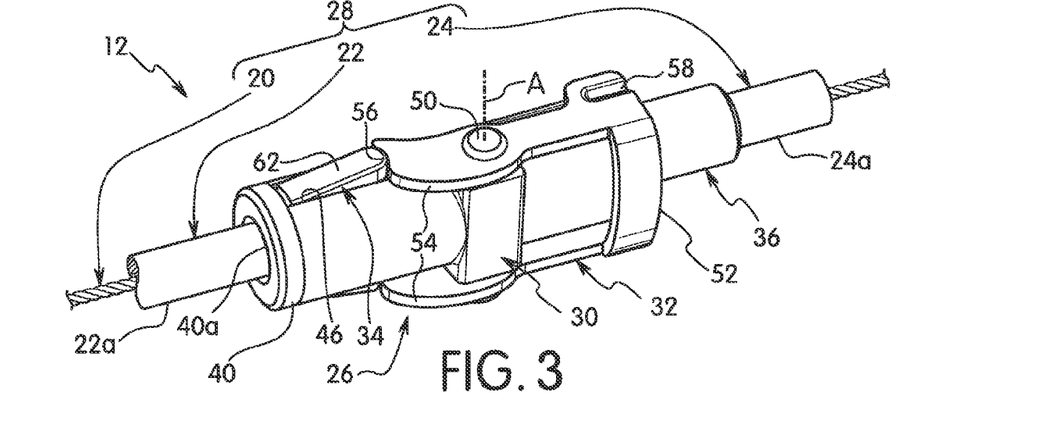
FIG. 3 is a perspective view of the bicycle cable structure illustrated in FIGS. 1 and 2 showing the operating member of the bicycle cable structure in the closed position.

Referring initially to FIGS. 1 and 2, a bicycle braking system 10 is illustrated with a bicycle cable structure 12 in accordance with a first embodiment. The bicycle cable structure 12 operatively interconnects a brake lever 14 to a bicycle brake caliper 16. By actuating a lever portion 14a of the brake lever 14, the brake lever 14 operates the brake caliper 16 to stop or slow rotation of a bicycle wheel 18 by squeezing a rim 18a of the bicycle wheel 18 with a pair of brake pads 16a on the ends of a pair of brake arms 16b. While the bicycle cable structure 12 is used in a bicycle braking system, the bicycle cable structure 12 can be used to operatively interconnect other cable operated bicycle components.

In the first embodiment, as seen in FIGS. 1 and 2, the bicycle cable structure 12 includes an inner wire or cable 20, a first outer case 22 and a second outer case 24. The bicycle cable structure 12 further includes an adjustment structure 26 that is disposed between adjacent ends 22a and 24a of the first and second outer cases 22 and 24. The adjustment structure 26 has a first contact surface CS1 and a second contact surface CS2, and the adjacent ends 22a and 24a of the first and second outer cases 22 and 24 contact the adjustment structure 26 at the first contact surface CS1 and the second contact surface CS2, respectively. Thus, the first outer case 22 is disposed over a first section of the inner cable 20, while the second outer case 24 is disposed over a second section of the inner cable 20. The inner cable 20 and the first and second outer cases 22 and 24 constitute a control cable 28 with the adjustment structure 26 effectively adjusting an overall effective length of the first and second outer cases 22 and 24 between non-adjacent or distal ends 22b and 24b of the first and second outer cases 22 and 24. The non-adjacent or distal ends 22b and 24b of the first and second outer cases 22 and 24 contact barrel adjusters 14b and 16c, respectively. The inner cable 20 is fixed at a first end to the lever portion 14a of the brake lever 14 in a conventional manner. The inner cable 20 extends through the barrel adjuster 16c, and is fixed at a second end to one of the brake arms 16b with a bolt 16d in a conventional manner.

Figure 4:
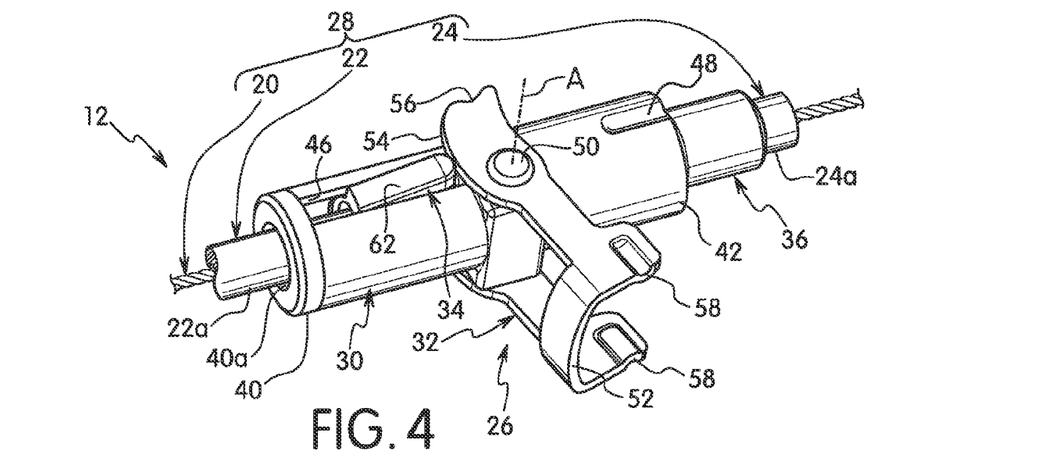
FIG. 4 is a perspective view of the bicycle cable structure illustrated in FIGS. 1 to 3 showing the operating member of the bicycle cable structure in the opened position.
Figure 5:
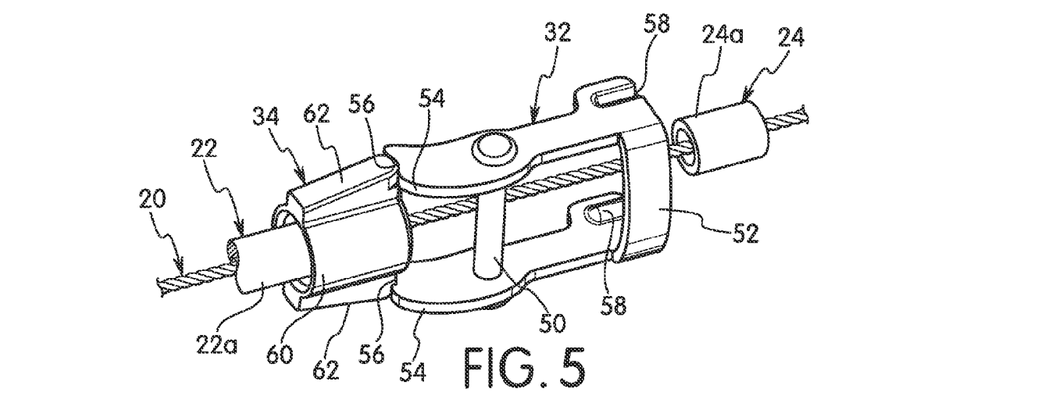
FIG. 5 is a perspective view of the bicycle cable structure illustrated in FIGS. 1 to 4 showing the operating member of the bicycle cable structure in the closed position, but with the main body removed.
Figure 6:
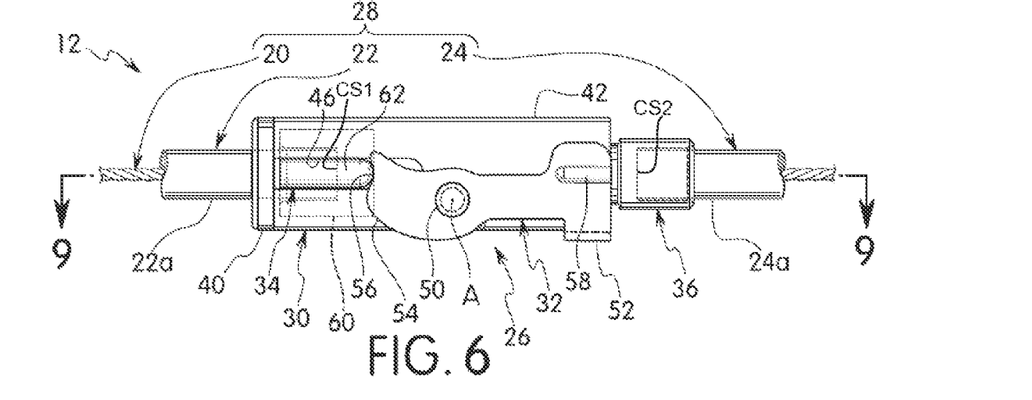
FIG. 6 is a side elevational view of the bicycle cable structure illustrated in FIGS. 1 to 5 showing the operating member of the bicycle cable structure in the closed position.
Figure 7:
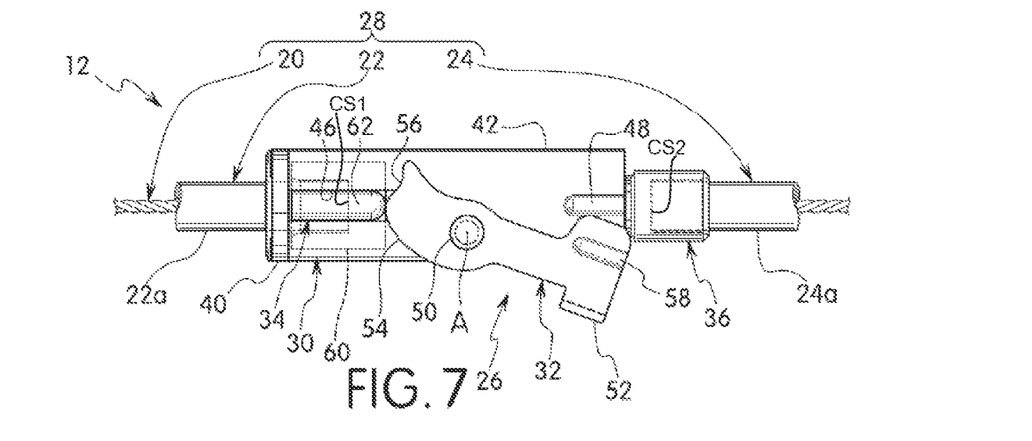
FIG. 7 is a side elevational view of the bicycle cable structure illustrated in FIGS. 1 to 6 showing the operating member of the bicycle cable structure in an intermediate position in between the closed and opened positions.
Figure 8:
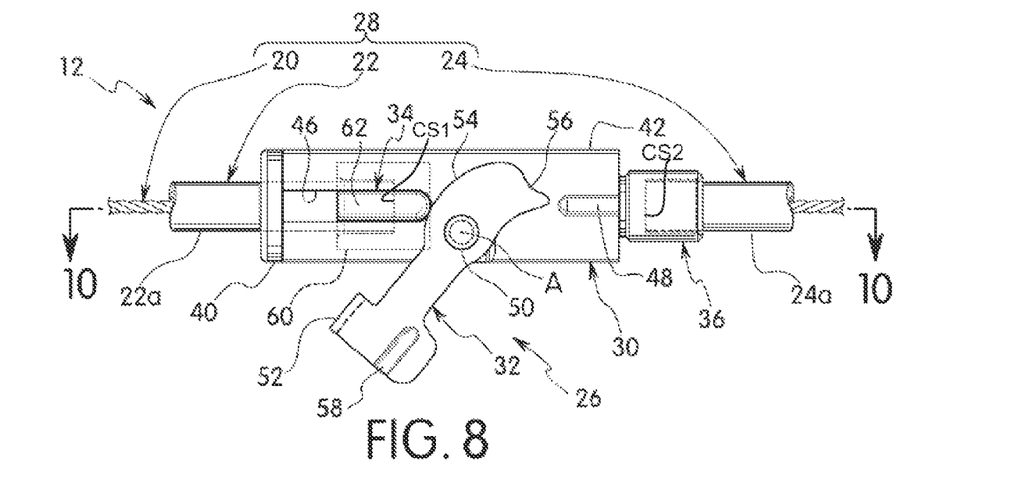
FIG. 8 is a side elevational view of the bicycle cable structure illustrated in FIGS. 1 to 7 showing the operating member of the bicycle cable structure in the opened position.
Figure 9:
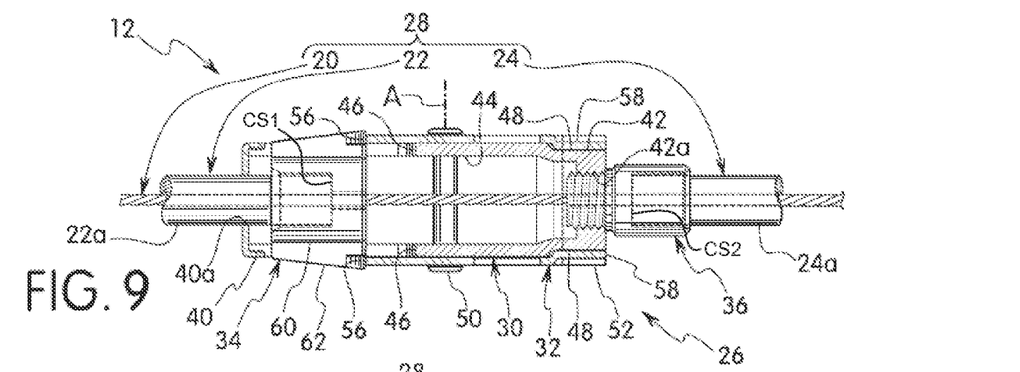
FIG. 9 is a longitudinal cross sectional view of the bicycle cable structure illustrated in FIGS. 1 to 8 as seen along section line 9-9 in FIG. 6.
Figure 10:
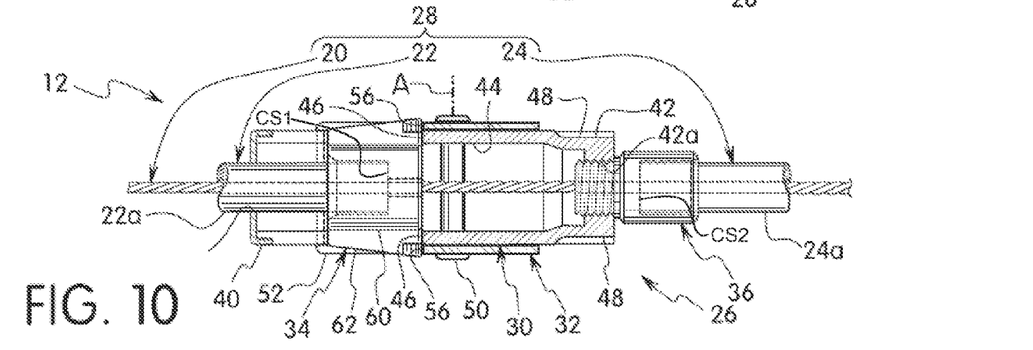
FIG. 10 is a longitudinal cross sectional view of the bicycle cable structure illustrated in FIGS. 1 to 9 as seen along section line 10-10 in FIG. 8.

Referring now to FIGS. 3 to 10, the adjustment structure 26 basically includes a main body 30 and an operating member 32. In the first embodiment, a slider 34 is slidably disposed inside of the main body 30 and is moved longitudinally within the main body 30 by the operating member 32, as discussed below. Preferably, the main body 30 includes a barrel adjuster 36 that is adjustably coupled to the main body 30 to variably fix the second contact surface CS2 of the adjustment structure 26 relative to the main body 30. In this first embodiment, the operating member 32 is pivotally mounted to the main body 30 for movement between a first position (FIGS. 3, 5, 6 and 9) and a second position (FIGS. 4, 8 and 10). The operating member 32 is movably connected to the main body 30 by a non-slidable connection between the first and second positions as discussed below.

The operating member 32 maintains the adjacent ends 22a and 24a of the first and second outer cases 22 and 24 farther away from each other while the operating member 32 is in the first position as compared to the second position of the operating member 32. Thus, as seen in FIG. 1, the first position of the operating member 32 constitutes a closed position in which the control cable 28 maintains the brake arms 16a and 16b of the bicycle brake caliper 16 in a ready position for the brake pads 16a to engage the bicycle rim 18a upon actuation of the brake lever 14. On the other hand, as seen in FIG. 2, the second position of the operating member 32 constitutes an opened position in which the control cable 28 maintains the brake arms 16b of the bicycle brake caliper 16 in a spread apart position such that the tire 18b can pass between the brake pads 16a for removal of the bicycle wheel 18.

Basically, the adjustment structure 26 adjusts an overall effective length of the first and second outer cases 22 and 24 by moving the operating member 32 relative to the main body 30. With the operating member 32 is in the first (closed) position (FIGS. 1, 3, 5, 6 and 9), the overall effective length of the first and second outer cases 22 and 24 is larger than when the operating member 32 is in the second (opened) position (FIGS. 2, 4, 8 and 10). While the adjustment structure 26 is illustrated as being used in connection with a bicycle braking system, the adjustment structure 26 can be used with other cable operated bicycle components as needed and/or desired.

As best seen in FIGS. 9 and 10, the main body 30 has a first end 40 with a first opening 40a, a second end 42 with a second opening 42a and a through hole 44 extending through the main body 30 between the first and second openings 40a and 42a in the first and second ends 40 and 42. In this first embodiment, the main body 30 is also provided with two openings 46 that cooperate the slider 34 and two recesses 48 that cooperate the operating member 32 as discussed below.

The first opening 40a slidably receives the adjacent end 22a of the first outer case 22. The second opening 42a is threaded for threadedly receiving the barrel adjuster 36 so that the barrel adjuster 36 is adjustably coupled to the second end 42 of the main body 30 to variably fix the second contact surface CS2 of the adjustment structure 26 relative to the second end 42 of the main body 30. Thus, once the barrel adjuster 36 is adjusted to the desired position, the location of the adjacent end 24a of the second outer case 24 is fixed relative to the second end 42 of the main body 30. Of course, the barrel adjuster 36 can be eliminated if desired so that the adjacent end 24a of the second outer case 24 directly contacts and abuts against the second end 42 of the main body 30.

The operating member 32 is pivotally mounted to the main body 30 by a pivot pin 50 that defines a pivot axis A. In this first embodiment, the operating member 32 is a lever that is pivotally mounted to the main body 30 about the pivot axis A to move between the first and second positions. However, as will become apparent from this disclosure, the operating member 32 is not limited to a lever.

Preferably, the operating member 32 (e.g. a lever) has a user grasping portion 52 and a pair of cam surfaces 54 (the cam surfaces 54 are an example of a first surface). The user grasping portion 52 and the cam surfaces 54 are oppositely spaced from the pivot axis A so that the rider can grasp the user grasping portion 52 to pivot the cam surfaces 54 about the pivot axis A to move between the first and second positions. Preferably, the user grasping portion 52 is located is a retracted orientation next to the main body 30 while the operating member 32 (e.g. the lever) in the first position, and the user grasping portion 52 is spaced from the main body 30 while the operating member 32 (e.g. the lever) is in the second position. In other words, the operating member 32 extends along the main body 30 in the first position such that accidental operation of the operating member 32 (e.g. the lever) is substantially prevented. However, the operating member 32 protrudes outwardly from the main body 30 in the second position such that the rider can easily determine that the adjustment structure 26 is in the opened or second position.

Preferably, the ends of the cam surfaces 54 are each provided with an abutment receiving recess 56 (the abutment receiving recess 56 is an example of a second surface), while the user grasping portion 52 is provided with a pair of protrusions 58. The abutment receiving recesses 56 and the protrusions 58 aid in maintaining the operating member 32 in the first position. In particular, the abutment receiving recesses 56 are arranged to receive the slider 34 while the operating member 32 is in the first position in order to maintain the first position. Also when the operating member 32 is in the first position, the protrusions 58 mate with the mating recesses 48 of the main body 30 for holding the operating member 32 in the first position. Thus, the mating recesses 48 of the main body 30 and the protrusions 58 of the operating member 32 constitute a first maintain structure for holding the operating member 32 in the first position. Also when the operating member 32 is in the first position, the abutment receiving recesses 56 are engaged by the slider 34 for holding the operating member 32 in the first position.

In this first embodiment, the slider 34 includes a base portion 60 and a pair of extended portions 62 projecting from opposite sides of the base portion 60. The extended portions 62 protrude out of the openings 46 of the main body 30 so that the base portion 60 slides inside of the main body 30. Basically, the adjacent end 22a of the first outer case 22 receives the base portion 60 of the slider 34 such that the adjacent end 22a of the first outer case 22 and the slider 34 are moved together by the operating member 32.

The extended portions 62 act as guide rails for controlling the relative movement of the slider 34 with respect to the main body 30. The extended portions 62 also act as abutments for the operating member 32 to move the adjacent end 22a of the first outer case 22 with respect to the adjacent end 24a of the second outer case 24 as the operating member 32 moves between the first and second positions. In particular, the cam surfaces 54 of the operating member 32 contact the extended portions 62 of the slider 34 and move the adjacent end 22a of the first outer case 22 via the slider 34 away from the adjacent end 24a of the second outer case 24 as the operating member 32 pivots from the second position to the first position. When the operating member 32 is in the first position, the abutment receiving recesses 56 of the operating member 32 are engaged by the extended portions 62 of the slider 34 for holding the operating member 32 (e.g. the lever) in the first position. Thus, the abutment receiving recesses 56 of the main body 30 and the extended portions 62 of the slider 34 constitute a second maintain structure for holding the operating member 32 in the first position.

Figure 11:
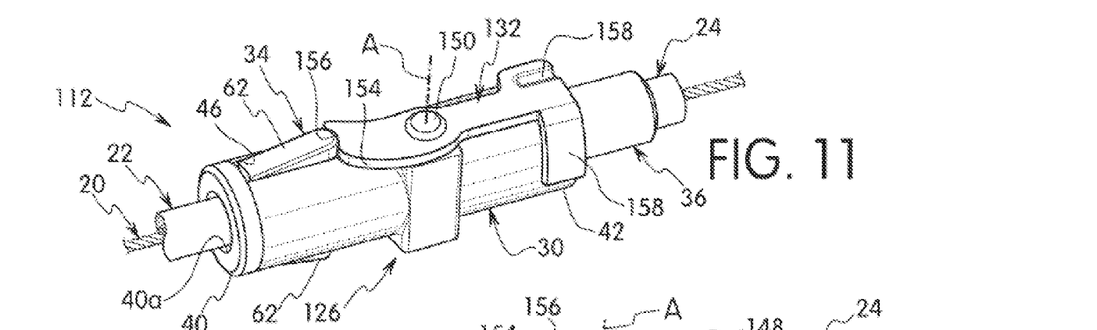
FIG. 11 is a perspective view of the bicycle cable structure in accordance with a second embodiment showing the operating member of the bicycle cable structure in the closed position.
Figure 12:
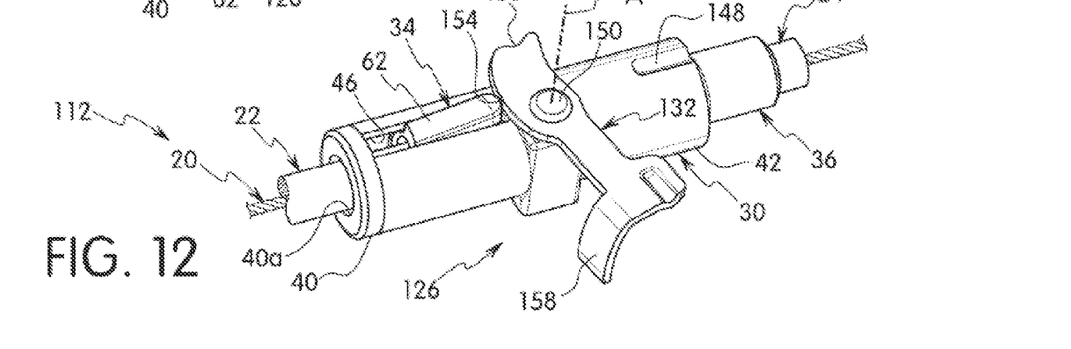
FIG. 12 is a perspective view of the bicycle cable structure illustrated in FIG. 11 showing the operating member of the bicycle cable structure in the opened position.

Referring now to FIGS. 11 and 12, a bicycle cable structure 112 in accordance with a second embodiment will now be explained. The bicycle cable structure 112 can be used with the brake lever 14 and the brake caliper 16 of FIGS. 1 and 2. The bicycle cable structure 112 includes an adjustment structure 126 that cooperates with the inner cable 20 and the first and second outer cases 22 and 24 to operate the brake caliper 16 using the brake lever 14. Thus, similar to the first embodiment, the adjustment structure 126 is disposed between the adjacent ends 22a and 24a of the first and second outer cases 22 and 24 and that receives the inner cable 20 therethrough. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Here, in the second embodiment, the only difference between the bicycle cable structures 12 and 112 is that the adjustment structure 126 uses a modified operating member 132. The operating member 132 is pivotally mounted to the main body 30 by a pivot pin 150 that defines the pivot axis A. Here, the operating member 132 (e.g. a lever) has a user grasping portion 152, and a single cam surface 151 (the cam surface 154 is an example of a first surface). The end of the cam surface 154 is provided with an abutment receiving recess 156, while the user grasping portion 152 is provided with a protrusion 158. Similar to the first embodiment, the abutment receiving recess 156 (the abutment receiving recess 156 is an example of a second surface) cooperates with one of the extended portions 62 of the slider 34, and the protrusion 158 cooperates with one of the mating recesses 48 of the main body 30.

Figure 13:
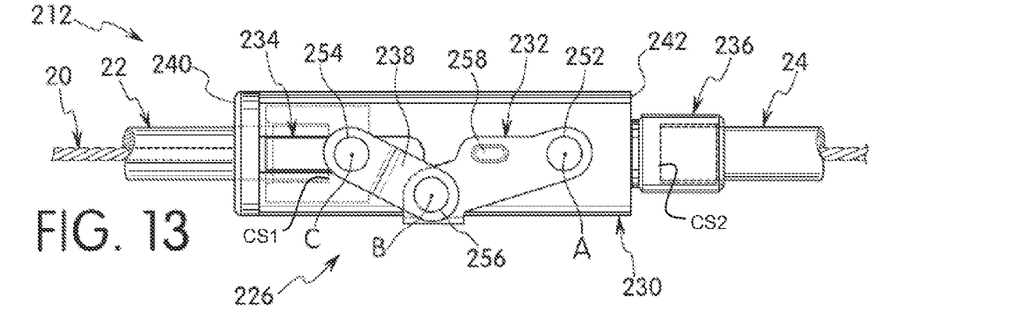
FIG. 13 is a side devotional view of the bicycle cable structure n accordance with a third embodiment showing the operating member of the bicycle cable structure in the closed position.
Figure 14:
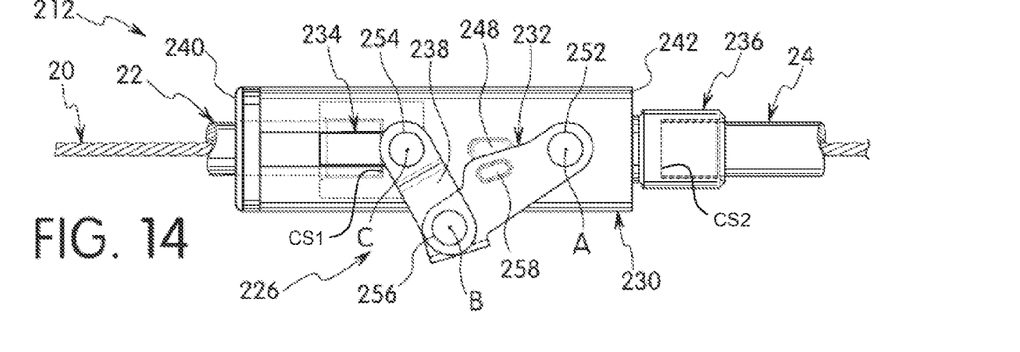
FIG. 14 is a side elevational view of the bicycle cable structure illustrated in FIG. 13 showing the operating member of the bicycle cable structure in the opened position.

Referring now to FIGS. 13 and 14, a bicycle cable structure 212 in accordance with a third embodiment will now be explained. The bicycle cable structure 212 can be used with the brake lever 14 and the brake caliper 16 of FIGS. 1 and 2. The bicycle cable structure 212 includes an adjustment structure 226 that cooperates with the inner cable 20 and the first and second outer cases 22 and 24 to operate the brake caliper 16 using the brake lever 14. Thus, similar to the first embodiment, the adjustment structure 226 is disposed between the adjacent ends 22a and 24a of the first and second outer cases 22 and 24 and that receives the inner cable 20 therethrough.

Here, in the third embodiment, the main difference between the bicycle cable structures 12 and 212 is that the adjustment structure 226 includes a modified main body 230 and a modified operating member 232. The adjustment structure 226 includes a slider 234 and a barrel adjuster 236 that are identical to the slider 34 and the barrel adjuster 36, respectively, except that the operating member 232 and the slider 234 are interconnected by a connecting link 238.

Similar to the first embodiment, the main body 230 has a first end 40 with a first opening (not shown), a second end 242 with a second opening (not shown), and a through hole (not shown), extending through the main body 230 between the first and second ends 240 and 242. The main body 230 has two openings 246 that cooperate the slider 234 and a recess 248 that cooperate the operating member 232. In view of the apparent similarity between the main bodies 30 and 230, the main body 230 will not be discussed in further detail.

The operating member 232 is a lever member that is pivotally mounted to the main body 230 by a pivot pin 250 that defines the pivot axis A. The operating member 232 also has a user grasping portion 252 for moving the operating member 232 between the first and second positions. The operating member 232 is operatively contacted to the slider 234 by the connecting link 238 which is pivotally coupled to the slider 234 by a pivot pin 254 and which is pivotally coupled to the operating member 232 by a pivot pin 256. The pivot pin 256 defines a pivot axis B, while the pivot pin 254 defines a pivot axis C.

Similar to the first embodiment, the user grasping portion 252 is located is a retracted orientation next to the main body 230 while the operating member 232 (e.g. the lever) is in the first (closed) position, and the user grasping portion 252 is spaced from the main body 230 while the operating member 232 (e.g. the lever) is in the second (opened) position. Basically, the connecting link 238 pushes the slider 234 and the adjacent end 22a of the first outer case 22 away from the adjacent end 24a of the second outer case 24 as the operating member 232 is pivoted from the second (opened) position to the first (closed) position. Since the operation of the adjustment structure 226 is readily apparent due to the similarities to the adjustment structure 26, a further discussion of the operation of the adjustment structure 226 will be omitted for the sake of brevity.

Figure 15:
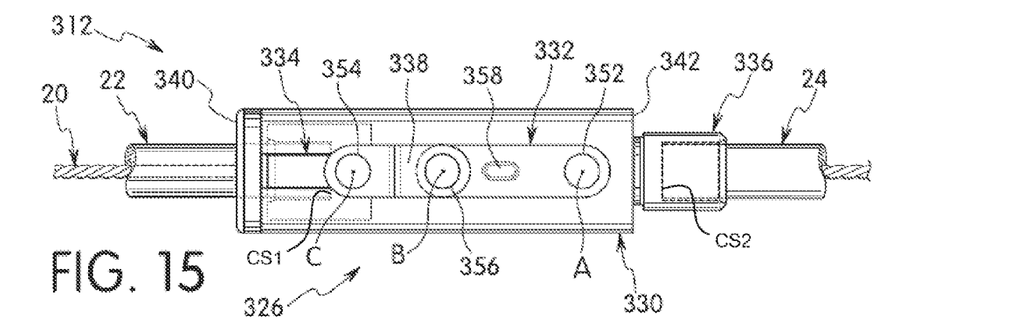
FIG. 15 is a side elevational view of the bicycle cable structure n accordance with a fourth embodiment showing the operating member of the bicycle cable structure in the closed position.
Figure 16:
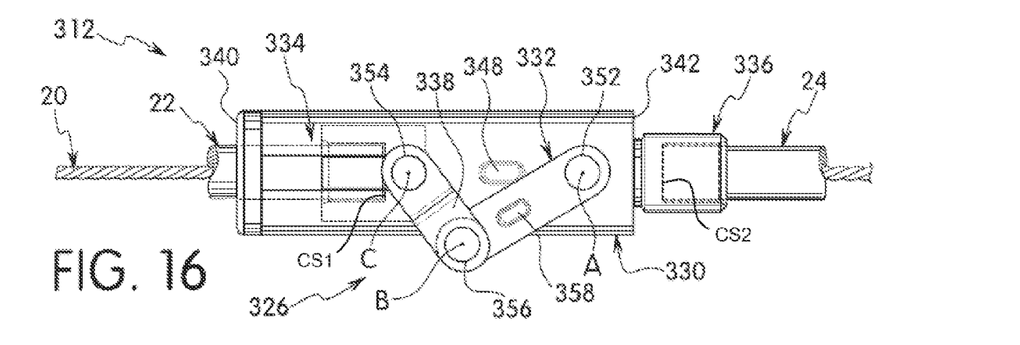
FIG. 16 is a side devotional view of the bicycle cable structure illustrated in FIG. 15 showing the operating member of the bicycle cable structure in the opened position.

Referring now to FIGS. 15 and 16, a bicycle cable structure 312 in accordance with a fourth embodiment will now be explained. The bicycle cable structure 312 is very similar to the bicycle cable structure 212. The bicycle cable structure 312 can be used with the brake lever 14 and the brake caliper 16 of FIGS. 1 and 2. The bicycle cable structure 312 includes an adjustment structure 326 that cooperates with the inner cable 20 and the first and second outer cases 2 and 24 to operate the brake caliper 16 using the brake lever 14. Thus, similar to the first embodiment, the adjustment structure 326 is disposed between the adjacent ends 22a and 24a of the first and second outer cases 22 and 24 and that receives the inner cable 20 therethrough.

Here, in the fourth embodiment, the main difference between the bicycle cable structures 12 and 312 is that the adjustment structure 326 includes a modified main body 330 and a modified operating member 332 that are more similar to the third embodiment. The adjustment structure 326 includes a slider 334 and a barrel adjuster 336 that are identical to the slider 34 and the barrel adjuster 36, respectively, except that the operating member 332 and the slider 334 are interconnected by a connecting link 338.

Similar to the first embodiment, the main body 330 has a first end 340 with a first opening (not shown), a second end) 42 with a second opening (not shown), and a through hole (not shown), extending through the main body 330 between the first and second ends 340 and 342. The main body 330 has two openings 346 that cooperate the slider 334 and a recess 348 that cooperate the operating member 332. In view of the apparent similarity between the main bodies 30 and 330, the main body 330 will not be discussed in further detail.

The operating member 332 is a lever member that is pivotally mounted to the main body 330 by a pivot pin 350 that defines the pivot axis A. The operating member 332 also has a user grasping portion 352 for moving the operating member 332 between the first and second positions. The operating member 332 is operatively contacted to the slider 334 by the connecting link 338 which is pivotally coupled to the slider 334 by a pivot pin 354 and which is pivotally coupled to the operating member 332 by a pivot pin 356. The pivot pin 356 defines the pivot axis B, while the pivot pin 354 defines the pivot axis C. Basically, the adjustment structure 326 differs from the adjustment structure 226 in that the pivot axes A, B and C are aligned when the operating member 332 is in the first (closed) position in the adjustment structure 326, while the pivot axes A, B and C are not aligned in the adjustment structure 226.

Similar to the prior embodiments, the user grasping portion 352 is located is a retracted orientation next to the main body 330 while the operating member 332 (e.g. the lever) is in the first (closed) position, and the user grasping portion 352 is spaced from the main body 330 while the operating member 332 (e.g. the lever) is in the second (opened) position. Basically, the connecting link 338 pushes the slider 334 and the adjacent end 22a of the first outer case 22 away from the adjacent end 24a of the second outer case 24 as the operating member 332 is pivoted from the second (opened) position to the first (closed) position. Since the operation of the adjustment structure 326 is readily apparent due to the similarities to the adjustment structures 26, 126 and 226, a further discussion of the operation of the adjustment structure 326 will be omitted for the sake of brevity.

Figure 17:
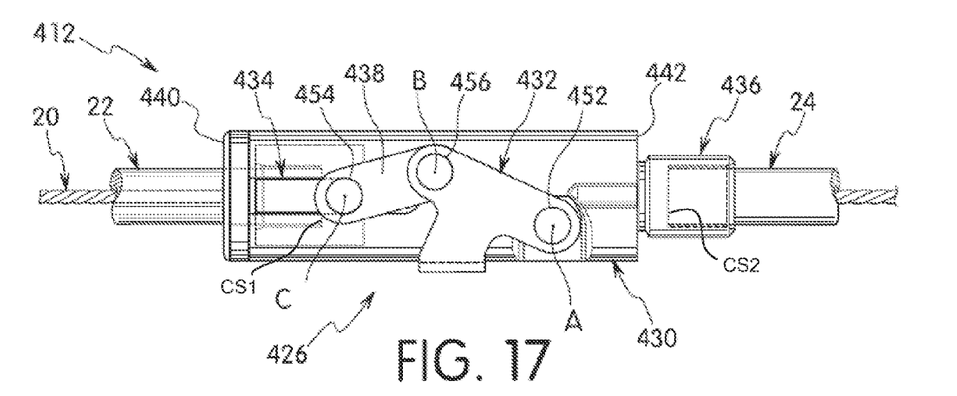
FIG. 17 is a side elevational view of the bicycle cable structure n accordance with a fifth embodiment showing the operating member of the bicycle cable structure in the closed position.
Figure 18:
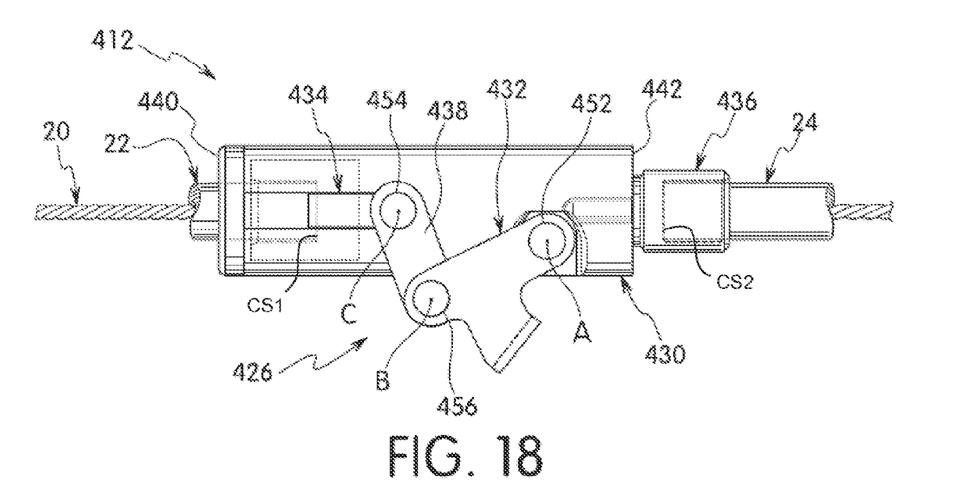
FIG. 18 is a side devotional view of the bicycle cable structure illustrated in FIG. 17 showing the operating member of the bicycle cable structure in the opened position.
Figure 19:
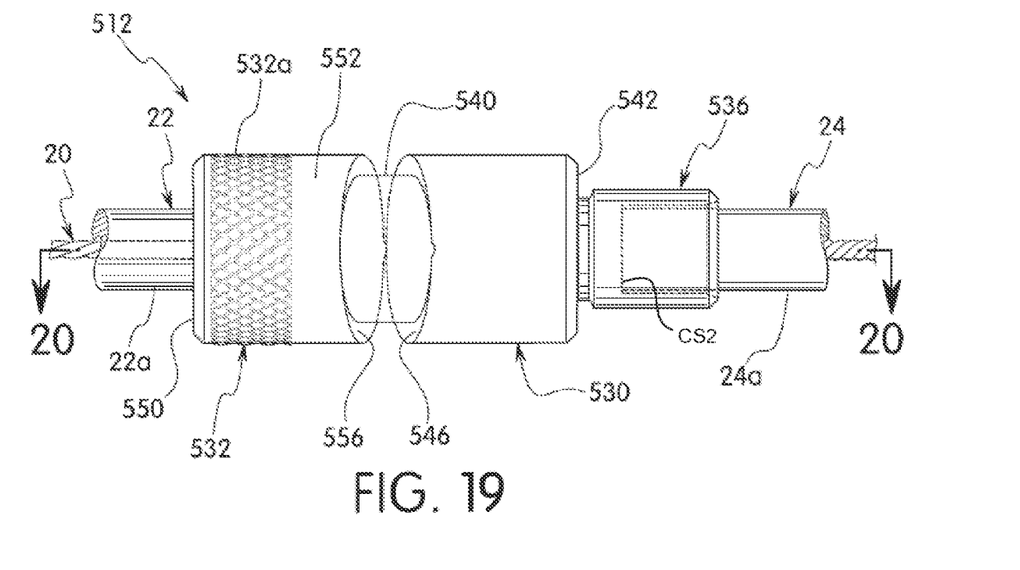
FIG. 19 is a side elevational view of the bicycle cable structure n accordance with a sixth embodiment showing the operating member of the bicycle cable structure in the closed position.
Figure 20:
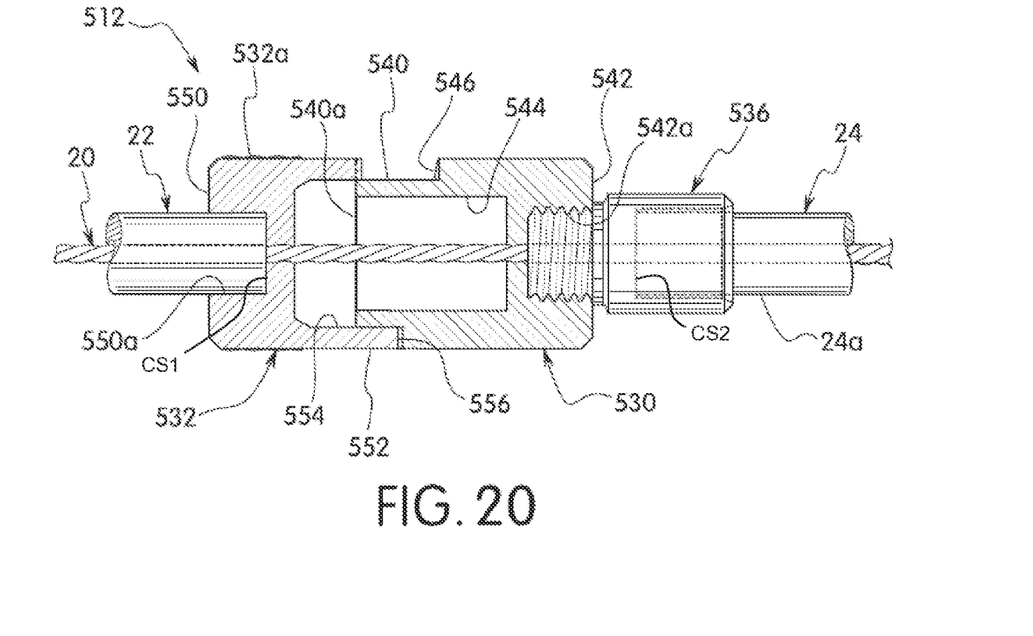
FIG. 20 is a longitudinal cross sectional view of the bicycle cable structure illustrated in FIG. 19 as seen along section line 20-20 in FIG. 19.
Figure 21:
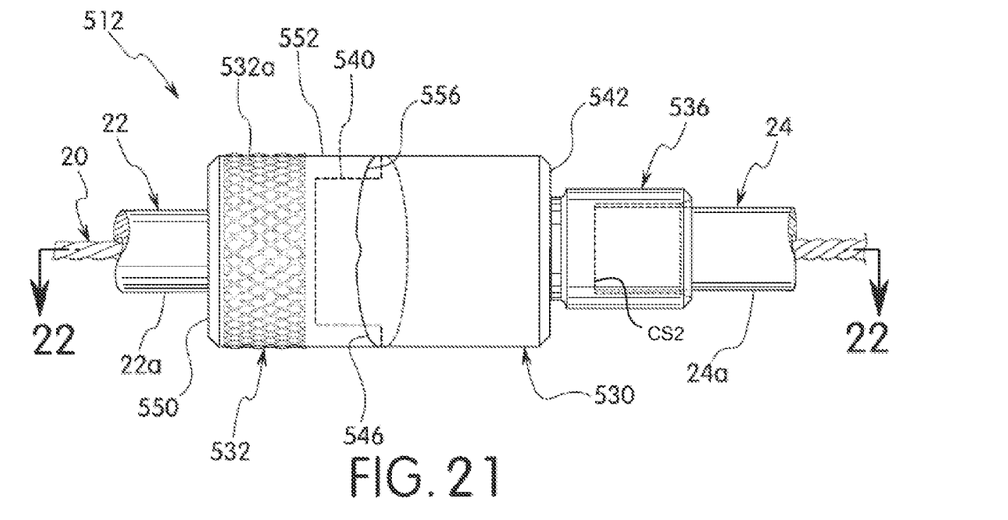
FIG. 21 is a side elevational view of the bicycle cable structure illustrated in FIGS. 19 and 20 showing the operating member of the bicycle cable structure in the opened position.
Figure 22:
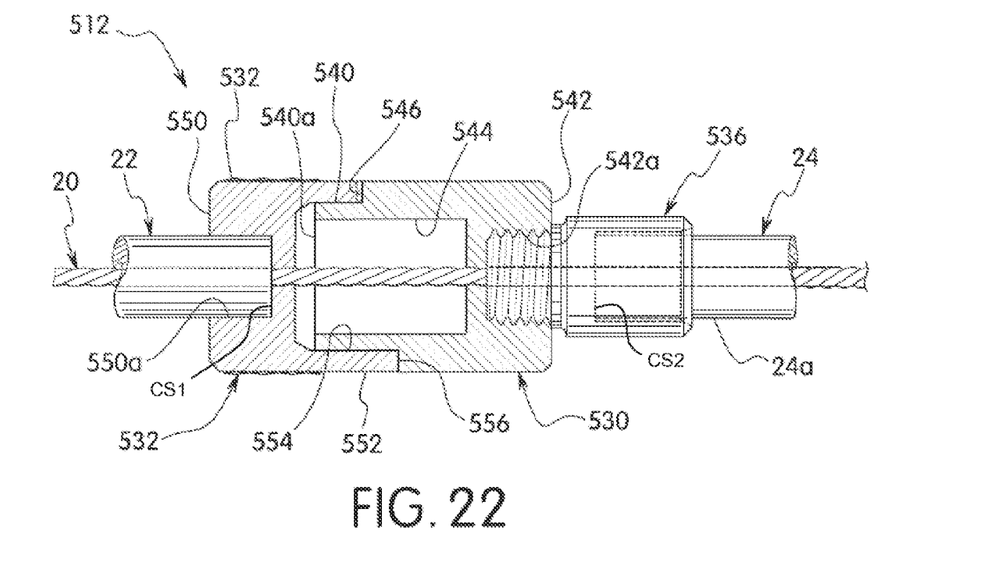
FIG. 22 is a longitudinal cross sectional view of the bicycle cable structure illustrated in FIG. 21 as seen along section line 22-22 in FIG. 21.

Referring now to FIGS. 17 and 18, a bicycle cable structure 412 in accordance with a fifth embodiment will now be explained. The bicycle cable structure 412 is very similar to the bicycle cable structures 212 and 312. The bicycle cable structure 412 can be used with the brake lever 14 and the brake caliper 16 of FIGS. 1 and 2. The bicycle cable structure 412 includes an adjustment structure 426 that cooperates with the inner cable 20 and the first and second outer cases 22 and 24 to operate the brake caliper 16 using the brake lever 11. Thus, similar to the first embodiment, the adjustment structure 126 is disposed between the adjacent ends 22a and 24a of the first and second outer cases 22 and 24 and that receives the inner cable 20 therethrough.

Here, in the fifth embodiment, the main difference between the bicycle cable structures 12 and 412 is that the adjustment structure 426 includes a modified main body 430 and a modified operating member 432 that are more similar to the third and fourth embodiments. The adjustment structure 126 includes a slider 134 and a barrel adjuster 136 that are identical to the slider 34 and the barrel adjuster 36, respectively, except that the operating member 432 and the slider 434 are interconnected by a connecting link 438.

Similar to the first embodiment, the main body 430 has a first end 410 with a first opening (not shown), a second end 442 with a second opening (not show and a through hole (not shown), extending through the main body 430 between the first and second ends 440 and 442. The main body 430 has two openings 446 that cooperate the slider 431. In view of the apparent similarity between the main bodies 30 and 430, the main body 430 will not be discussed in further detail.

The operating member 432 is a lever member that is pivotally mounted to the main body 430 by a pivot pin 450 that defines the pivot axis A. The operating member 432 also has a user grasping portion 452 for moving the operating member 432 between the first and second positions. The operating member 432 is operatively contacted to the slider 434 by the connecting link 438 which is pivotally coupled to the slider 434 by a pivot pin 451 and which is pivotally coupled to the operating member 432 by a pivot pin 456. The pivot pin 456 defines the pivot axis B, while the pivot pin 454 defines the pivot axis C. Basically, the adjustment structure 426 differs from the adjustment structures 226 and 336 in that the pivot axis B passes across a centerline interconnecting the pivot axes A and C. Thus, the operating member 432 and the connecting link 438 form an over the center type of linkage arrangement.

Similar to the prior embodiments, the user grasping portion 452 is located is a retracted orientation next to the main body 430 while the operating member 432 (e.g. the lever) is in the first (closed) position, and the user grasping portion 452 is spaced from the main body 430 while the operating member 132 (e.g. the lever) is in the second (opened) position. Basically, the connecting link 438 pushes the slider 434 and the adjacent end 22a of the first outer case 22 away from the adjacent end 24a of the second outer case 24 as the operating member 432 is pivoted from the second (opened) position to the first (closed) position. Since the operation of the adjustment structure 426 is readily apparent due to the similarities to the adjustment structures 26, 126 and 226, a further discussion of the operation of the adjustment structure 426 will be omitted for the sake of brevity.

Referring now to FIGS. 19 to 22, a bicycle cable structure 512 in accordance with a sixth embodiment will now be explained. The bicycle cable structure 512 can be used with the brake lever 14 and the brake caliper 16 of FIGS. 1 and 2. The bicycle cable structure 512 includes an adjustment structure 526 that cooperates with the inner cable 20 and the first and second outer cases 22 and 24 to operate the brake caliper 16 using the brake lever 14. Thus, similar to the first embodiment, the adjustment structure 526 is disposed between the adjacent ends 22a and 24a of the first and second outer cases 22 and 24 and that receives the inner cable 20 therethrough.

Here, in the sixth embodiment, the adjustment structure 526 includes a main body 530 and a twistable operating member 432. The main body 530 includes a barrel adjuster 536 that are identical to the barrel adjuster 36. The main body 530 further includes a first end 540 with a first opening 540a, a second end 542 with a second opening 542a, and a through hole 544 extending through the main body 530 between the first and second openings 540a and 542a. The main body 530 further includes a cam surface 546.

The operating member 532 is a twistable member that is twistably mounted to the main body 530 to twist about the longitudinal axis of the inner cable 20. The operating member 432 has a user grasping portion 532a for twisting the operating member 532 between a first position shown in FIGS. 19 and 20 and a second position shown in FIGS. 21, and 22. The operating member 532 includes a first end 550 with a first opening 550a, a second end 552 with a second opening 552a, and a through hole 554 extending through the operating member 532 between the first and second openings 550a and 552a. The operating member 532 further includes a cam surface 556 that cooperates with the cam surface 546 of the main body 530 to move the operating member 532 axially along the inner cable 20 in response to twisting of the operating member 532. Basically, twisting the operating member 532 causes the cam surface 556 to ride on the cam surface 546 of the main body 530 such that the first end 550 moves the adjacent end 22a of the first outer case 22 away from the adjacent end 24a of the second outer case 24 as the operating member 332 is twisted from the second (opened) position to the first (closed) position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle cable structure comprising:
   an inner cable;
   a first outer case disposed over a first section of the inner cable;
   a second outer case disposed over a second section of the inner cable; and
   an adjustment structure disposed between adjacent ends of the first and second outer cases, the adjustment structure having a first contact surface arranged to contact the adjacent end of the first outer case and a second contact surface arranged to contact the adjacent end of the second outer case, the adjustment structure including
      a main body having a first end with a first opening, a second end with a second opening and a through hole extending through the main body between the first and second openings in the first and second ends; and
      an operating member being pivotally mounted to the main body between a first position and a second position, the operating member having a first surface and a second surface that selectively maintain the first and second contact surfaces at different distances such that the adjacent ends of the first and second outer cases are farther away from each other while the operating member is in the first position as compared to the second position of the operating member.

2. The bicycle cable structure according to claim 1, wherein
   the main body includes a barrel adjuster that is adjustably coupled to the second end of the main body to variably fix the second contact surface relative to the second end of the main body.

3. The bicycle cable structure according to claim 1, wherein
   the adjustment structure includes a slider that is slidably coupled to the main body between the operating member and the adjacent end of the first outer case, the slider being moved by the operating member as the operating member moves from the second position to the first position.

4. The bicycle cable structure according to claim 3, wherein
the main body includes a barrel adjuster that is adjustably coupled to the second end of the main body to variably fix the second contact surface relative to the second end of the main body.

5. The bicycle cable structure according to claim 3, wherein
the slider is slidably disposed inside of the main body, the slider including an extended portion that protrudes out of an opening of the main body, and
the operating member contacts the extended portion of the slider and moves the adjacent end of the first outer case via the slider away from the adjacent end of the second outer case as the operating member moves from the second position to the first position.

6. The bicycle cable structure according to claim 5, wherein
the slider further includes a hole passing through the slider and having the inner cable passing therethrough; and
the main body includes a barrel adjuster that is adjustably coupled to the second end of the main body to variably fix the second contact surface relative to the second end of the main body.

7. The bicycle cable structure according to claim 1, further comprising
a maintain structure holding the operating member in the first position.

8. The bicycle cable structure according to claim 7, wherein
the maintain structure includes at least one protrusion provided on one of the operating member and the main body and a mating recess provided on the other one of the operating member and the main body.

9. The bicycle cable structure according to claim 1, wherein
the operating member includes a lever having a user grasping portion spaced from a pivot axis of the lever, the user grasping portion being located next to the main body while the operating member is in the first position and the user grasping portion spaced from the main body while the operating member is in the second position.

10. The bicycle cable structure according to claim 9, wherein
the adjustment structure includes a slider that is slidably coupled to the main body between the operating member and the adjacent end of the first outer case; and
the lever includes a cam surface which contacts the slider and moves the adjacent end of the first outer case away from the adjacent end of the second outer case as the operating member pivots from the second position to the first position.

11. The bicycle cable structure according to claim 10, wherein
the lever includes a receiving recess that is located at an end of the cam surface, the receiving recess being arranged to receive an extended portion of the slider while the operating member is in the first position in order to maintain the first position.

12. The bicycle cable structure according to claim 10, wherein
the slider further includes a hole passing through the slider and having the inner cable passing therethrough; and
the main body includes a barrel adjuster that is adjustably coupled to the second end of the main body to variably fix the second contact surface relative to the second end of the main body.

13. The bicycle cable structure according to claim 9, wherein
the adjustment structure includes a slider that is slidably disposed inside the main body between the operating member and the adjacent end of the first outer case, and the slider including a pair of extended portions that protrudes out of a pair of openings of the main body, and
the lever includes a pair of cam surfaces which contacts the extended portions of the slider and moves the adjacent end of the first outer case away from the adjacent end of the second outer case as the operating member pivots from the second position to the first position.

14. The bicycle cable structure according to claim 13, wherein
the lever includes two receiving recesses that are located at ends of the cam surfaces, respectively, the receiving recesses being arranged to receive the extended portions of the slider while the operating member is in the first position in order to maintain the first position.

15. The bicycle cable structure according to claim 14, wherein
the lever and the main body includes a maintain structure comprising two protrusions and two mating recesses that mate to hold the operating member in the first position.

16. The bicycle cable structure according to claim 13, wherein
the slider further includes a hole passing through the slider and having the inner cable passing therethrough; and
the main body includes a barrel adjuster that is adjustably coupled to the second end of the main body to variably fix the second contact surface relative to the second end of the main body.

17. The bicycle cable structure according to claim 9, wherein
the adjustment structure includes a slider that is slidably coupled to the main body between the operating member and the adjacent end of the first outer case, and
the operating member further includes a connecting link pivotally connected between the lever and the slider, the connecting link pushes the adjacent end of the first outer case away from the adjacent end of the second outer case as the operating member pivots from the second position to the first position.

18. A bicycle cable structure comprising:
an inner cable;
a first outer case disposed over a first section of the inner cable;
a second outer case disposed over a second section of the inner cable; and
an adjustment structure disposed between adjacent ends of the first and second outer cases, the adjustment structure having a first contact surface arranged to contact the adjacent end of the first outer case and a second contact surface arranged to contact the adjacent end of the second outer case, the adjustment structure including
a main body having a first end with a first opening, a second end with a second opening and a through hole extending through the main body between the first and second openings in the first and second ends; and
an operating member movably connected to the main body between a first position and a second position, the operating member extending along the main body in the first position and protruding outwardly from the main body in the second position, the operating member having a first surface and a second surface that selectively maintain the first and second contact surfaces at different distances such that the adjacent ends of the first and second outer cases are farther away from each other while the operating member is in the first position as compared to the second position of the operating member.

* * * * *